(12) United States Patent
Mouri et al.

(10) Patent No.: US 9,470,885 B2
(45) Date of Patent: Oct. 18, 2016

(54) EYEPIECE OPTICAL SYSTEM AND OPTICAL APPARATUS

(71) Applicant: Nikon Corporation, Chiyoda-ku, Tokyo (JP)

(72) Inventors: Motohisa Mouri, Kawasaki (JP); Taku Matsuo, Kawasaki (JP); Yukio Kubota, Tsurugashima (JP); Takuya Sato, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/492,032

(22) Filed: Sep. 21, 2014

(65) Prior Publication Data

US 2015/0077858 A1 Mar. 19, 2015

Related U.S. Application Data

(63) Continuation of application No. 14/375,791, filed as application No. PCT/JP2013/051745 on Jan. 28, 2013, now abandoned.

(60) Provisional application No. 61/608,456, filed on Mar. 8, 2012.

(30) Foreign Application Priority Data

Jan. 30, 2012 (JP) .................................. 2012-016550

(51) Int. Cl.
*G02B 25/00* (2006.01)
*G03B 13/06* (2006.01)
*G02B 13/18* (2006.01)

(52) U.S. Cl.
CPC ............. *G02B 25/001* (2013.01); *G02B 13/18* (2013.01); *Y10T 29/49826* (2015.01)

(58) Field of Classification Search
CPC ............................ G02B 25/001; G02B 23/14
USPC .......................... 359/643–647; 396/373, 382
See application file for complete search history.

(56) References Cited

U.S. PATENT DOCUMENTS

| 5,446,590 A | 8/1995 | Kikuchi |
| 7,061,684 B2 | 6/2006 | Shirota |

(Continued)

FOREIGN PATENT DOCUMENTS

| JP | 06-027394 A | 2/1994 |
| JP | 11-109259 A | 4/1999 |

(Continued)

OTHER PUBLICATIONS

International Search Report from International Patent Application No. PCT/JP2013/051745, Apr. 23, 2013.
International Preliminary Report on Patentability from International Patent Application No. PCT/JP2013/051745, Aug. 5, 2014.

*Primary Examiner* — William Choi
(74) *Attorney, Agent, or Firm* — Shapiro, Gabor and Rosenberger, PLLC

(57) ABSTRACT

Providing an eyepiece optical system 10 comprising: an eyepiece system 11; and an optical member 12 having a meniscus shape disposed to an eye side of the eyepiece system 11, the following conditional expression being satisfied:

$$2.00 < |R|/fe < 22.00$$

where fe denotes a focal length of the eyepiece system 11 when a diopter of the eyepiece system 11 is 0 ($m^{-1}$), and R denotes a radius of curvature of the surface having the meniscus shape, and the optical member 12 with a meniscus shape having a concave surface facing the eye side.

19 Claims, 15 Drawing Sheets

(56) References Cited

U.S. PATENT DOCUMENTS

2003/0156834 A1* 8/2003 Ogata .................... G03B 13/02
                                                        396/373
2004/0223216 A1    11/2004 Shirota

FOREIGN PATENT DOCUMENTS

| JP | 2001-051319 A | 2/2001 |
| JP | 2004-333937 A | 11/2004 |

* cited by examiner

EYEPIECE OPTICAL SYSTEM AND OPTICAL APPARATUS

FIELD OF THE INVENTION

The present invention relates to an eyepiece optical system for observing a real image and an optical apparatus equipped with the eyepiece optical system.

RELATED BACKGROUND ART

In order to prevent that a luminescent spot or a high contrast image formed in an observation field, in particular, in a frame is reflected from a surface of a protection window provided on the last optical surface for dustproof and the like, focused again in the vicinity of a focal plane of the eyepiece, and observed as a ghost image, there has been an eyepiece optical system in which an antireflection coating and the like is applied on the surface of the protection window. However, in such an eyepiece optical system, it has been difficult to suppress ghost images when the contrast of the real image is extremely strong.

Accordingly, in order to prevent ghost images in the field of view when the contrast is extremely strong, a finder optical system in which a protection window member has curvature has been proposed (see, for example, Patent Document 1).

PRIOR ART DOCUMENTS

Patent Documents

[Patent Document 1] Japanese Patent Application Laid-Open No. 2001-51319

SUMMARY OF THE INVENTION

Problems to be Solved by the Invention

However, in the conventional proposal, the way of application has been ambiguous, so that the effect has been difficult to be obtained.

The present invention is made in view of the above-described problem, and has an object to provide an eyepiece optical system capable of effectively reducing ghost images generated such that light rays emanated from a luminous spot and the like in the field of view are reflected from an optical surface disposed to an eye side of the eyepiece system, and an optical apparatus equipped with the eyepiece optical system.

Way to Solve the Problem

In order to solve the problem, the present invention provides an eyepiece optical system comprising: an eyepiece system; and an optical member disposed to an eye side of the eyepiece system, the optical member having meniscus shape at least on a periphery thereof and the following conditional expression being satisfied:

$$2.00 < |R|/fe < 22.00$$

where fe denotes a focal length of the eyepiece system when diopter of the eyepiece system is 0 ($m^{-1}$), and R denotes a radius of curvature of at least one surface of the meniscus shaped portion of the optical member.

Moreover, in order to solve the above-described problem, the present invention provides an optical apparatus equipped with the above-described eyepiece optical system.

Moreover, in order to solve the above-described problem, the present invention provides a method for manufacturing an eyepiece optical system having a eyepiece system and an optical member comprising;

a step of forming the optical member into a meniscus shape at least on a periphery thereof so as to satisfy following conditional expression:

$$2.00 < |R|/fe < 22.00$$

a step of disposing the eyepiece system into a lens barrel, a step of disposing the optical member on an eye side of the eyepiece system in the lens barrel, where fe denotes a focal length of the eyepiece system when diopter of the eyepiece system is 0 ($m^{-1}$), and R denotes a radius of curvature of at least one surface of the meniscus shaped portion of the optical member.

Effect of the Invention

The present invention makes it possible to provide an eyepiece optical system capable of effectively reducing ghost images generated such that light rays emanated from a luminous spot and the like in the field of view are reflected from an optical surface disposed to an eye side of the eyepiece system, and an optical apparatus equipped with the eyepiece optical system.

Figure 1:
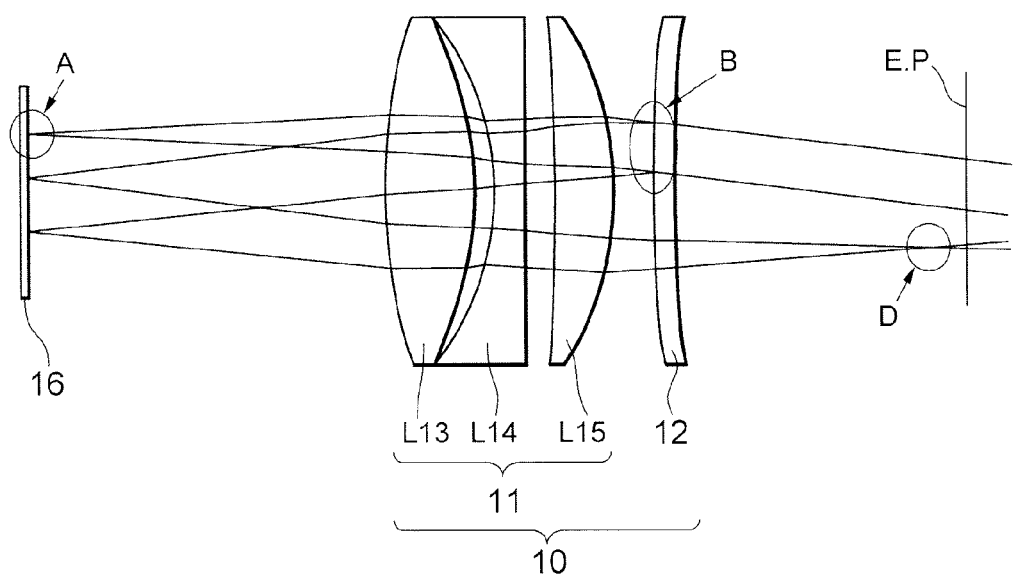
FIG. 1 is a sectional view showing a lens configuration of an eyepiece optical system according to Example 1 of the present application.

PREFERRED EMBODIMENTS FOR CARRYING OUT THE INVENTION (First Embodiment)

An eyepiece optical system according to a first embodiment of the present application is explained below. The eyepiece optical system is provided for focusing an image displayed on a display member such as a liquid crystal onto an eye of an observer.

The eyepiece optical system according to the first embodiment of the present application includes, an eyepiece system, and an optical member having a meniscus shape disposed to an eye side of the eyepiece system as a protection window member (hereinafter called 'a protection window member' in the first embodiment), and the following conditional expression is satisfied:

$$2.00 < |R|/fe < 22.00 \quad (1)$$

where fe denotes a focal length of the eyepiece system when diopter of the eyepiece system is 0 $(m^{-1})$, and R denotes a radius of curvature of the surface having the meniscus shape.

In the eyepiece optical system according to the first embodiment of the present application, with providing the protection window member having a meniscus shape as the last optical member to the eye side of the eyepiece system, it becomes possible to give a divergent effect to light rays emanated from an image of a luminescent spot (an image of a display member) in the field of view, incident on a surface of the protection window member and reflected therefrom, so that a position where the luminescent spot is focused again can be separated away from the display member. As a result, the ghost image that is focused again and a regular real image are made not to be observed at the same time, so that the visibility of the ghost image is reduced.

The above-described conditional expression (1) defines the optimum shape of the protection window member. With satisfying conditional expression (1), it becomes possible to effectively avoid ghost images generated from a high luminance image.

When the value of conditional expression (1) is equal to or falls below the lower limit, it becomes easy to avoid ghost images generated in the field of view. However, refractive power of the protection window member becomes strong, so that an adverse effect is made on aberration performance of the whole of the eyepiece optical system. As a result, high optical performance cannot be obtained. In order to secure the effect of the present application, it is preferable to set the lower limit of conditional expression (1) to 4.85, so that better optical performance with reduced aberration can be obtained. Moreover, it is preferable to set the lower limit to 5.50, so that better optical performance can be obtained.

On the other hand, when the value of conditional expression (1) is equal to or exceeds the upper limit, although the effect to the eyepiece optical system becomes small, the position where the ghost forming light rays are focused again becomes closer to the display member, so that ghost images tend to be generated. In this case, when the eyepiece optical system is moved along the optical axis for adjusting diopter, there is a strong possibility that the ghost image becomes easy to be observed. In order to secure the effect of the present application, it is preferable to set the upper limit of the conditional expression to 15.00, so that the effect of the ghost image can be lowered. Moreover, when the upper limit is set to 10.00, the effect of the ghost image can be further lowered.

Incidentally, in the first embodiment, although conditional expression (1) defines the optimum shape of the protection window member as the last optical member, it is not necessary to be the last optical member, as long as the optical member is disposed to the eye side of the eyepiece system, with satisfying conditional expression (1), ghost images can be effectively reduced and high optical performance can be obtained.

Regarding the unit of diopter $(m^{-1})$, for example, diopter X $(m^{-1})$ indicates that an image is formed by the eyepiece at a position separated on the optical axis by 1/X (m) from the eyepoint (where the sign is positive when the image is formed to the observer side of the eyepiece).

In consideration of diopter adjustment, the radius of curvature is preferably set such that the position where the ghost forming light rays are focused again is separated along the optical axis at least $3 \times (fe^2/1000)$ from the position of the display member. This condition indicates three times of the moving amount of the display member, which varies 1 $(m^{-1})$ diopter at the position of the display member. In other words, the condition means that when the diopter is adjusted to the display member in the observation state, the position of the ghost image is placed in a state different by the amount of substantially 3 $(m^{-1})$ diopter. With placing in such a state, ghost images can be made inconspicuous in the ordinary observation state. Incidentally, there is no need to say that it is advantageous to put the position of the ghost image further away than the above-described condition.

In the eyepiece optical system according to the first embodiment, the protection window member that is the optical member having a meniscus shape is preferably disposed with a concave surface facing the eye side, i.e. so as to be convex on the side of the eyepiece system. With disposing the convex surface facing the eyepiece system and the concave surface facing the eye side, external light rays from the eye side become hard to be reflected from the eye side surface of the protection window member and enter the pupil of the observer. In particular, the external light rays upon observation are incident with a large angle of incidence with respect to the optical axis of the eyepiece owing to the head of the observer. Accordingly, with making the eye side optical surface a concave shape, the optical surface is located backward in comparison with a convex shape that is convex toward the side of the eye, so that the external light rays become difficult to enter. Even upon entering, the angle of incidence becomes larger in comparison with the convex surface, so that external light rays tend to be reflected outside of the field of view, and become difficult to enter the observer's eye.

Moreover, the eyepiece optical system according to the first embodiment satisfies the following conditional expressions:

$$fe < 40.00 \quad (2)$$

$$Y < fe/3.00 \quad (3)$$

where Y denotes the maximum image height of the real image to be observed.

Conditional expression (2) defines a focal length of the eyepiece system. Conditional expression (3) defines the upper limit of the maximum image height of the real image.

With satisfying conditional expressions (2) and (3), it becomes possible to effectively avoid ghost images. When the value of conditional expression (3) is equal to or exceeds the upper limit, the real image plane to be observed becomes large, so that curvature of the protection window member affects aberration performance of the eyepiece system, in particular, peripheral performance of the field of view. In order to secure the effect of the present application, it is preferable to set the upper limit of conditional expression (3) to fe/3.5, so that it becomes possible to effectively avoid ghost images. Moreover, with setting the upper limit of conditional expression (3) to fe/4.0, it becomes possible to further effectively avoid ghost images.

In the first embodiment, the protection window member is preferably made from resin. With this construction, the protection window member becomes light and easy to be formed, so that impact resistance can be increased. As for the resin, for example, acrylic and polycarbonate may be used.

Figure 11:
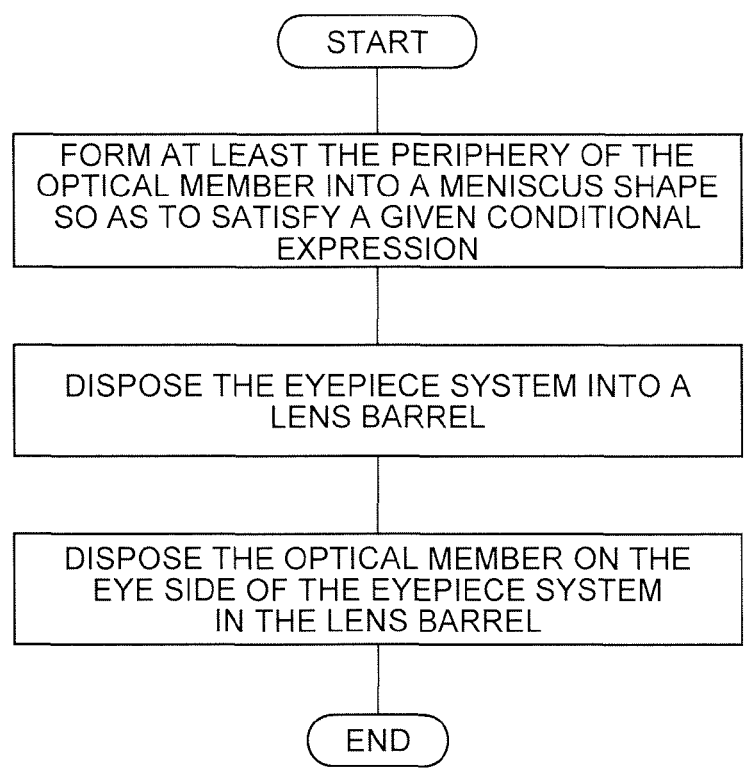
FIG. 11 is a process chart showing the method for manufacturing the eyepiece optical system of the present application.

A brief summary of a method for manufacturing an eyepiece optical system having an eyepiece system and an optical member of a protection window member will be explained below with reference to FIG. 11.

Firstly, at least the periphery of the optical member is formed into a meniscus shape to satisfy following conditional expression:

$$2.00 < |R|/fe < 22.00$$

the eyepiece system is disposed in a cylindrical lens barrel, the optical member is disposed on the eye side of the eyepiece system, where fe denotes a focal length of the eyepiece system when diopter of the eyepiece system is 0 (m$^{-1}$), and R denotes a radius of curvature of at least one surface of the meniscus shaped portion of the optical member.

An eyepiece optical system according to each example of the first embodiment of the present application is explained below with reference to accompanying drawings.

EXAMPLE 1

FIG. 1 is a sectional view showing a lens configuration of an eyepiece optical system according to Example 1 of the first embodiment. The eyepiece optical system according to Example 1 of the first embodiment includes, in order from an object side, an eyepiece system 11 and a protection window member 12.

The eyepiece system 11 is composed of a double convex positive lens L13, a double concave negative lens L14 and a positive meniscus lens L15 having a concave surface facing the object side.

In Example 1, the protection window member 12 is an optical member having a meniscus shape having a concave surface facing an eye side. With disposing the concave surface facing the eye side, external light rays from the eye side become difficult to be reflected from the surface of the last optical member and enter a pupil of an observer. In particular, the external light rays upon observation are incident with a large angle of incidence with respect to the optical axis of the eyepiece owing to a head of the observer. Accordingly, with making the optical surface of the protection window member 12 having a meniscus shape a concave shape, the optical surface is located backward in comparison with a case where the optical surface has a convex shape, so that the external light rays become difficult to enter. Even upon entering, the angle of incidence becomes larger in comparison with the convex surface, so that probability of the external light rays being reflected outside of the field of view can be increased.

Moreover, in Example 1, both surfaces of the object side and the eye side of the protection window member 12 have the same radius of curvature of 50 mm. Even if both side surfaces have the same radii of curvature in this manner, the protection window member 12 has refractive power although it is extremely small. However, with making the radius of curvature large and constructing the curved surface to have a convex surface facing the eyepiece side, an angle of the converging bundle of rays from the eyepiece to the eyepoint E.P incident onto the curved surface that is convex against the converging bundle of rays can be small as shown in the first embodiment, so that aberration performance of the eyepiece is hardly affected.

Optical paths of display light and ghost forming light rays from a display member 16 are shown in FIG. 1. With constructing the protection window member 12 to have curvature, although bundle of rays from a point A on the display member 16 are reflected on a surface (point B) of the protection window member 12, the display member 16 side surface of the protection window member 12 has divergent effect with respect to the reflected bundle of rays, so that the reflected light does not form an image in the vicinity of the display member, and is reflected on the surface of the display member 16, and incident on the eyepiece system 11 and the protection window member 12, and converges on the point D in the vicinity of the eyepoint. Accordingly, although the reflected bundle of rays reach the eye as stray light, it cannot be observed as a ghost image by the observer.

Various values associated with the eyepiece optical system according to Example 1 are listed below in Table 1. The focal length of the eyepiece system is fe=24.59 mm. The maximum object height of the observed object is assumed to be 6.0 mm in Example 1 and the following Examples. In (Surface Data), numerical values in the left most column are surface numbers counted in order from the object side. In order from the right side thereof, "radius of curvature" is a radius of curvature of each optical surface (the negative sign denotes a concave surface facing the object side), "distance" is a distance of lens surfaces, "nd" denotes a refractive index at d-line (wavelength λ=587.6 nm), and "vd" denotes an Abbe number at d-line (wavelength λ=587.6 nm). "E.P" denotes an eyepoint. Moreover, "*" attached to the left side of the surface number denotes an aspherical surface, and the radius of curvature of "∞" indicates a plane surface.

In (Aspherical Surface Data), an aspherical surface is expressed by the following expression:

$$x = (y^2/r)/(1+(1-\kappa(y^2/r^2))^{1/2}) + C4 \times y^4 + C6 \times y^6 + C8 \times y^8 + C10 \times y^{10}$$

where "y" denotes a vertical height from the optical axis, x denotes a displacement along the optical axis at the height y, r denotes a radius of curvature of a reference sphere (paraxial radius of curvature), κ denotes a conical coefficient, and Cn denotes an aspherical coefficient of n-th order.

(Values for Conditional Expressions) show corresponding value of each conditional expression.

Here, "mm" is generally used for the unit of length such as the radius of curvature and the distance between lens surfaces shown in Table 1. However, since similar optical performance can be obtained by an optical system proportionally enlarged or reduced its dimension, the unit is not necessarily to be limited to this. The explanation of reference symbols described in Table 1 is the same in the other Examples described later.

TABLE 1

(Surface Data)

| surface number | radius of curvature | distance | nd | vd |
|---|---|---|---|---|
| 1) | ∞ | 18.5 | 1.0 | |
| *2) | 18.46305 | 4.5 | 1.49108 | 57.57 |
| 3) | −14.09265 | 1.0 | 1.0 | |
| *4) | −10.86467 | 1.5 | 1.58518 | 30.24 |
| 5) | 203.88888 | 1.5 | 1.0 | |
| 6) | −95.39091 | 3.0 | 1.49108 | 57.57 |
| *7) | −11.57101 | 1.5 | 1.0 | |
| 8) | 50.00000 | 1.0 | 1.49108 | 57.57 |
| 9) | 50.00000 | 15.0 | 1.0 | |
| 10) | E.P | | | |

(Aspherical Surface Data)

Surface Number: 2

κ = −1.7818
C6 = 0.0

Surface Number: 4

κ = 1.0000
C6 = 0.65762E−06

Surface Number: 7

κ = 0.5034
C6 = 0.0

(Values for Conditional Expressions)

(1) |R|/fe = 2.03
(2) fe = 24.59
(3) fe/3 = 8.19

Figure 6:
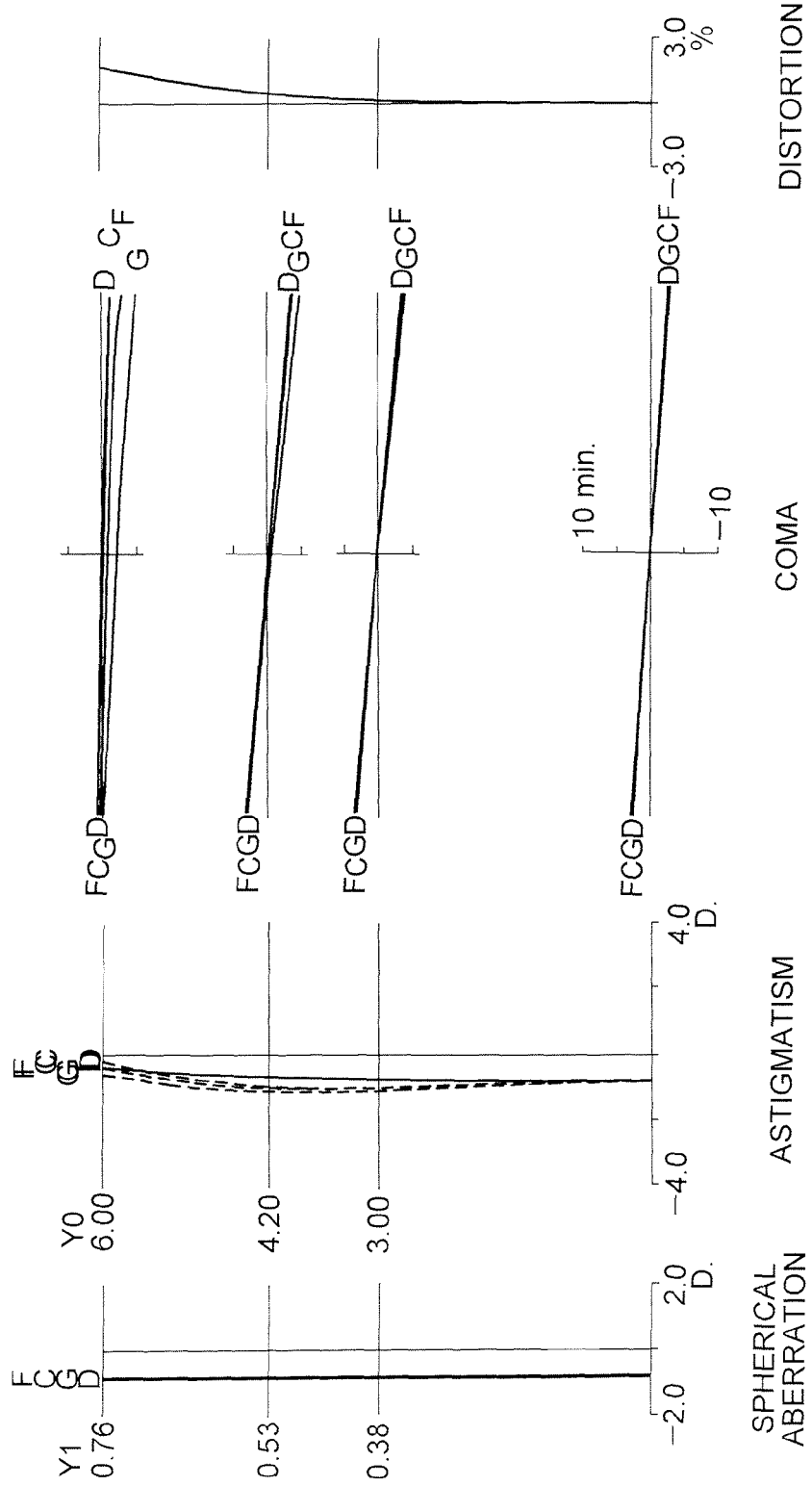
FIG. 6 displays graphs showing various aberrations of the eyepiece optical system according to Example 1 of the present application.

FIG. 6 displays graphs showing various aberrations of the eyepiece optical system according to Example 1 of the present application. In graphs showing spherical aberration, "Y1" denotes a height of a ray incident on an erecting system. In graphs showing astigmatism, "Y0" denotes the height of the display member. In graphs showing coma, "min" denotes a minute in angular unit. In graphs, "C", "F" and "D" denote aberration curves at C-line (wavelength: 656.3 nm), F-line (wavelength: 486.1 nm), and d-line (wavelength: 587.6 nm), respectively. In graphs showing spherical aberration and astigmatism, the unit of horizontal axis "D" is "m$^{-1}$". Incidentally, in aberration graphs of each Example described later, the same reference symbols as Example 1 are used.

As is apparent from the respective graphs shown in FIG. 6, the eyepiece optical system 10 according to Example 1 shows superb optical performance as a result of good corrections to various aberrations. In comparison with FIG. 14, which shows aberration curves of a reference example explained later, it is understood that even if a protection window member 12 having the radius of curvature within the range of the above-described conditional expression (1) is used, deterioration in aberration performance of the eyepiece optical system 10 is not shown.

EXAMPLE 2

Figure 2:
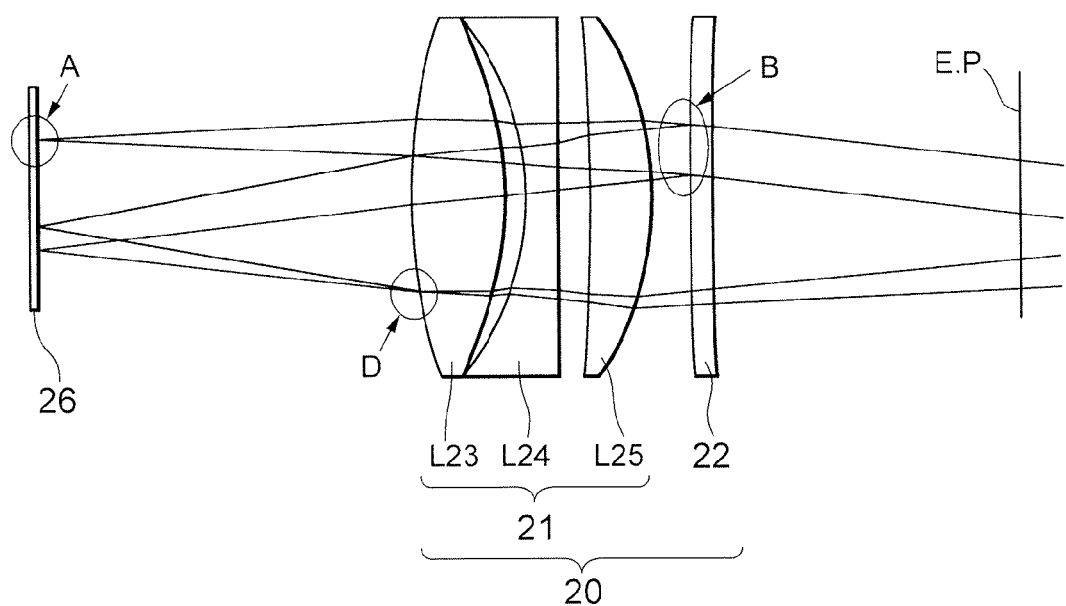
FIG. 2 is a sectional view showing a lens configuration of an eyepiece optical system according to Example 2 of the present application.

FIG. 2 is a sectional view showing a lens configuration of an eyepiece optical system 20 according to Example 2 of the first embodiment. Example 2 has the same fundamental lens configuration as Example 1. However, Example 2 differs from Example 1 such that the radius of curvature of the protection window member 22 is 50 mm in Example 1, while that is 125 mm in Example 2.

Optical paths of display light and a ghost image from a display member 26 are shown in FIG. 2. Since the radius of curvature of the protection window member 22 is made larger than that of Example 1, divergent effect to the ghost forming light rays becomes weak, so that it is understood that the position (point D) where the ghost forming light rays are focused again becomes nearer to the display member than FIG. 1 in Example 1. However, the position is sufficiently separated away more than the amount of 3×(fe$^2$/1000) from the display member, so that the observer is difficult to observe the light focused again as a ghost image at the eyepoint. Accordingly, ghost images can be effectively reduced unless the value of conditional expression (1) is equal to or falls below the lower limit.

Various values associated with the eyepiece optical system according to Example 2 are listed below in Table 2. The focal length of the eyepiece system is fe=24.59 mm.

TABLE 2

(Surface Data)

| surface number | radius of curvature | distance | nd | vd |
|---|---|---|---|---|
| 1) | ∞ | 18.5 | 1.0 | |
| *2) | 18.46305 | 4.5 | 1.49108 | 57.57 |
| 3) | −14.09265 | 1.0 | 1.0 | |
| *4) | −10.86467 | 1.5 | 1.58518 | 30.24 |
| 5) | 203.88888 | 1.5 | 1.0 | |
| 6) | −95.39091 | 3.0 | 1.49108 | 57.57 |
| *7) | −11.57101 | 1.5 | 1.0 | |
| 8) | 125.00000 | 1.0 | 1.49108 | 57.57 |
| 9) | 125.00000 | 15.0 | 1.0 | |
| 10) | E.P | | | |

(Aspherical Surface Data)

Surface Number: 2

κ = −1.7818
C6 = 0.0

Surface Number: 4

κ = 1.0000
C6 = 0.65762E−06

Surface Number: 7

κ = 0.5034
C6 = 0.0

(Values for Conditional Expressions)

(1) |R|/fe = 5.08
(2) fe = 24.59
(3) fe/3 = 8.19

Figure 7:
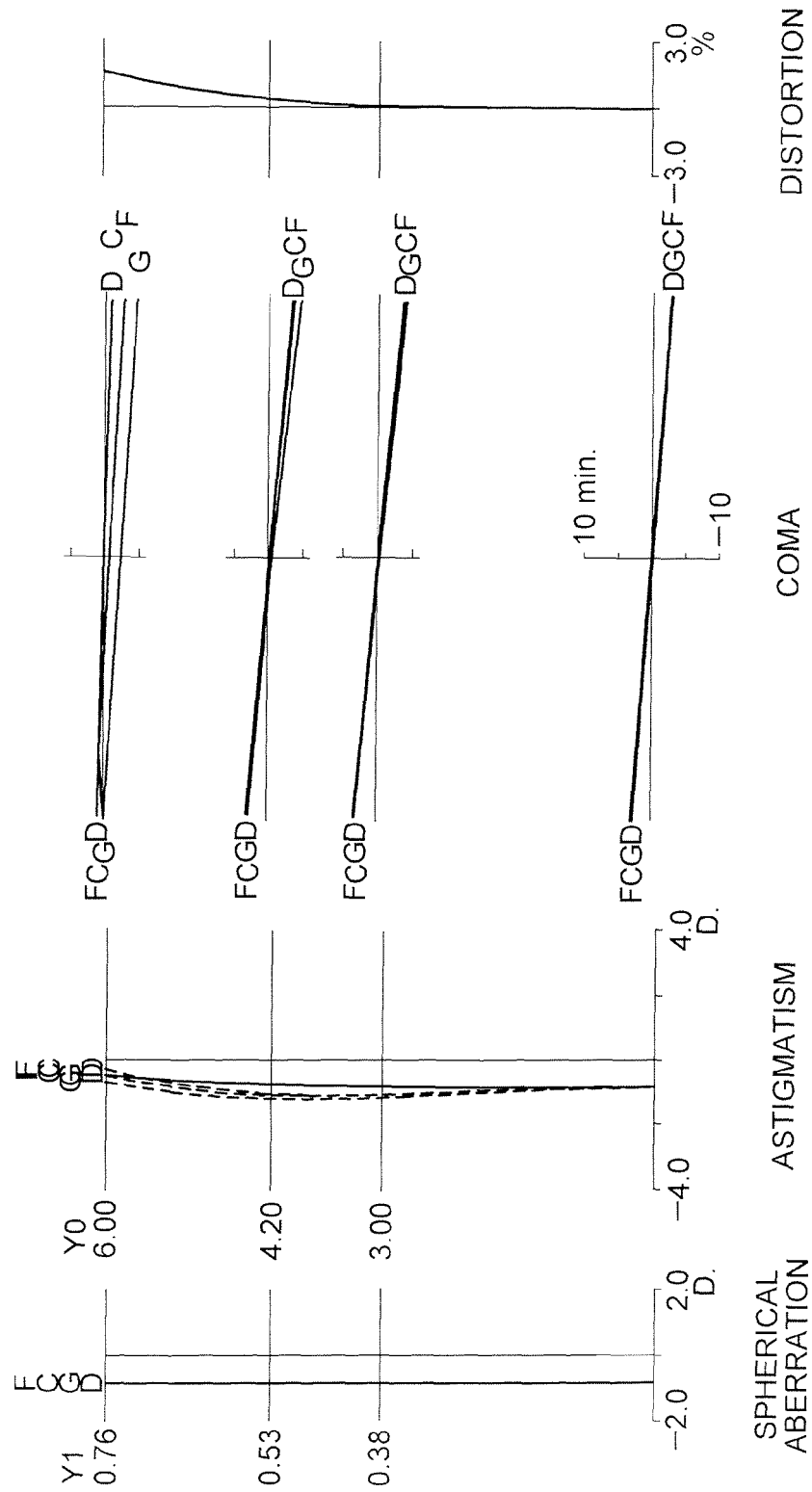
FIG. 7 displays graphs showing various aberrations of the eyepiece optical system according to Example 2 of the present application.

FIG. 7 displays graphs showing various aberrations of the eyepiece optical system 20 according to Example 2 of the present application. As is apparent from the respective graphs, the eyepiece optical system 20 according to Example 2 shows superb optical performance as a result of good corrections to various aberrations. In comparison with FIG. 14, which shows aberration curves of a reference example explained later, it is understood that even if a protection window member 22 having the radius of curvature within the range of the above-described conditional expression is used, deterioration in aberration performance of the eyepiece optical system 20 is not shown.

EXAMPLE 3

Figure 3:
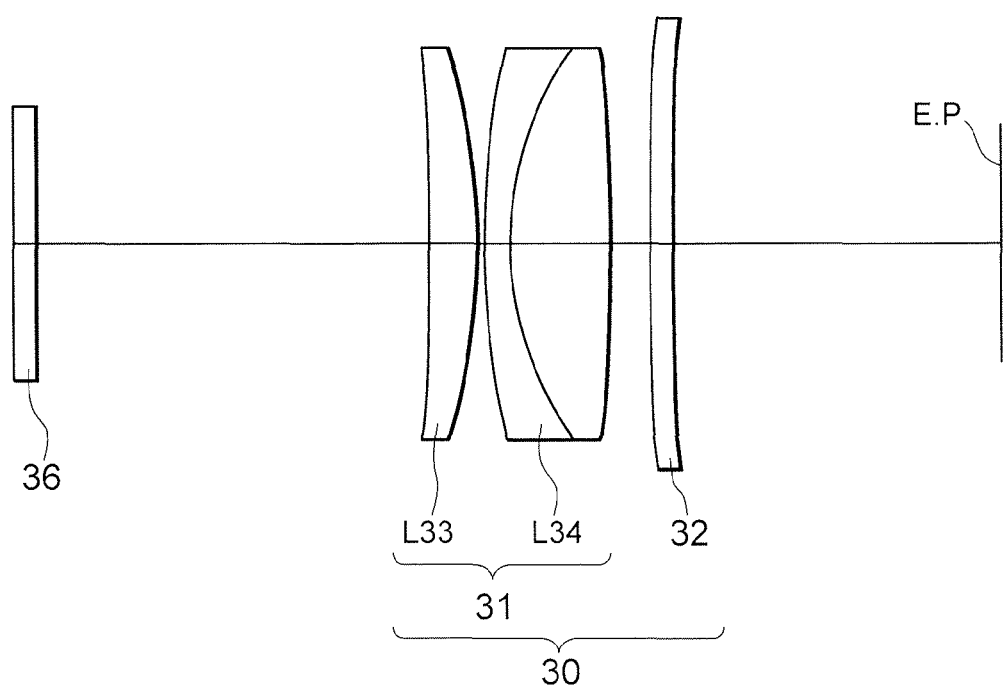
FIG. 3 is a sectional view showing a lens configuration of an eyepiece optical system according to Example 3 of the present application.

FIG. 3 is a sectional view showing a lens configuration of an eyepiece optical system 30 according to Example 3 of the first embodiment. The eyepiece optical system 30 according to Example 3 is composed of, in order from an object side, an eyepiece system 31 and a protection window member 32.

The eyepiece system 31 is composed of a positive meniscus lens L33 having a concave surface facing the object side, and a cemented lens L34 constructed by a negative meniscus lens having a convex surface facing the object side cemented with a double convex positive lens.

In Example 3, the protection window member 32 has a meniscus shape having a concave surface facing an eye side, a radius of curvature of the object side is 90 mm, and that of the eye side is 95 mm, so that the curvature is different between the object side surface and the eye side surface.

In the present invention, even if refractive power of about 1/100 of the refractive power of the eyepiece is given to an optical member disposed to the eye side, aberration of the eyepiece is not affected, so that it is no problem that radii of curvature of the front and rear surfaces of the last optical member may be varied within that range. Incidentally, even if the curvature of object side and that of the eye side are set to become concentric, ghost image avoiding effect can be obtained without affecting aberration performance.

Various values associated with the eyepiece optical system according to Example 3 are listed below in Table 3. The focal length of the eyepiece system is fe=23.16 mm.

TABLE 3

(Surface Data)

| surface number | radius of curvature | distance | nd | vd |
|---|---|---|---|---|
| 1) | ∞ | 20.2 | 1.0 | |
| 2) | −175.00000 | 2.2 | 1.51680 | 64.14 |
| 3) | −29.50000 | 0.3 | 1.0 | |
| 4) | 38.00000 | 1.2 | 1.84666 | 23.78 |
| 5) | 14.00000 | 4.5 | 1.80400 | 46.58 |
| 6) | −78.00000 | 1.8 | 1.0 | |
| 7) | 90.00000 | 1.0 | 1.49108 | 57.57 |
| 8) | 95.00000 | 15.2 | 1.0 | |
| 9) | E.P | | | |

(Values for Conditional Expressions)

(1) |R| (object side surface)/fe = 3.88
(1) |R| (eye side surface)/fe = 4.09
(2) fe = 23.16
(3) fe/3 = 7.72

Figure 8:
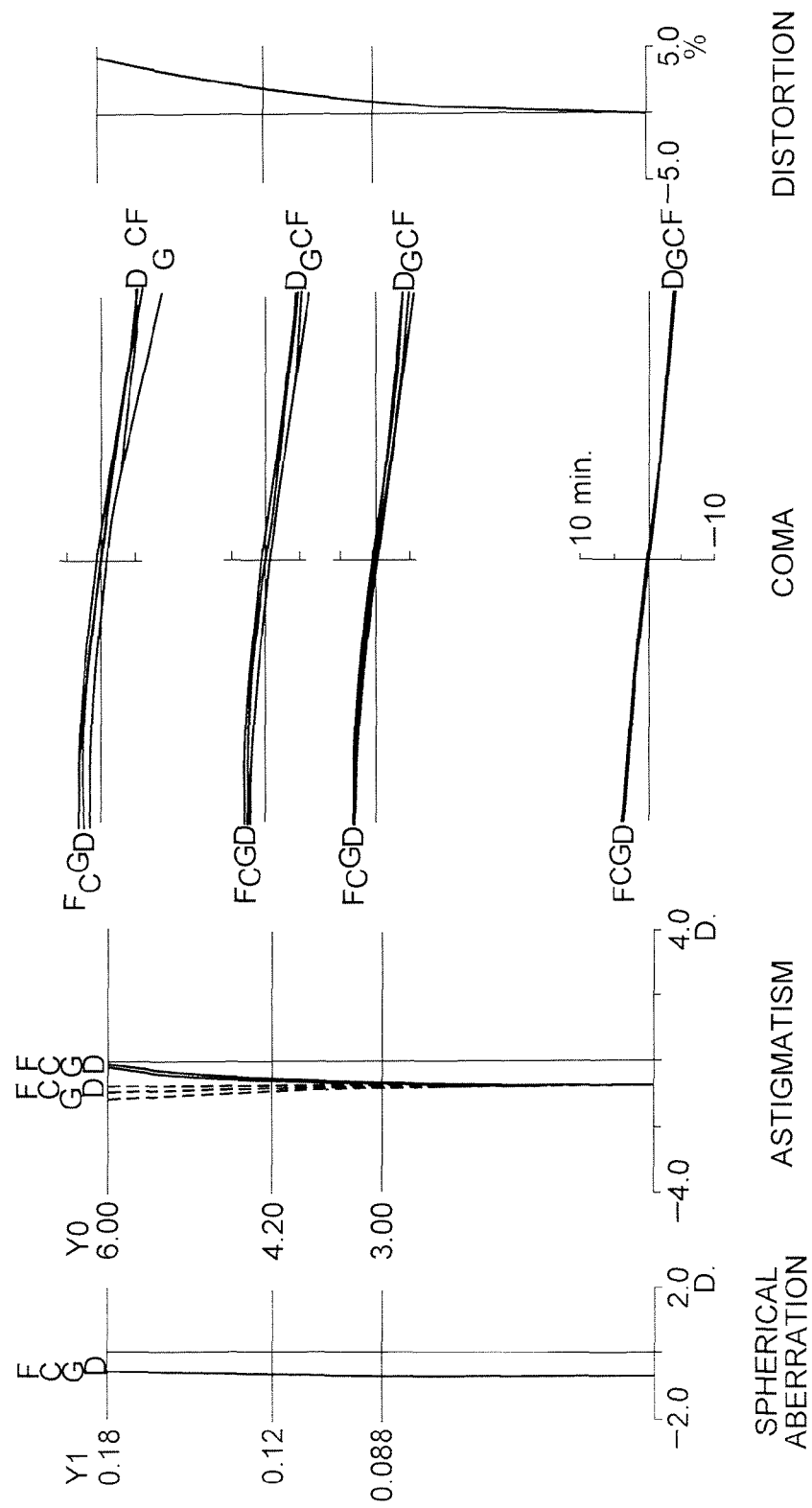
FIG. 8 displays graphs showing various aberrations of the eyepiece optical system according to Example 3 of the present application.

FIG. 8 displays graphs showing various aberrations of the eyepiece optical system 30 according to Example 3 of the first embodiment. As is apparent from the respective graphs, the eyepiece optical system 30 according to Example 3 shows superb optical performance as a result of good corrections to various aberrations. Moreover, in comparison with FIG. 6 according to Example 1 and FIG. 7 according to Example 2, it is understood that even if the radii of curvature of the object side surface and the eye side surface of the protection window member 32 differ within the range of conditional expression (1), deterioration in aberration performance of the eyepiece optical system 30 does not exist.

EXAMPLE 4

Figure 4:
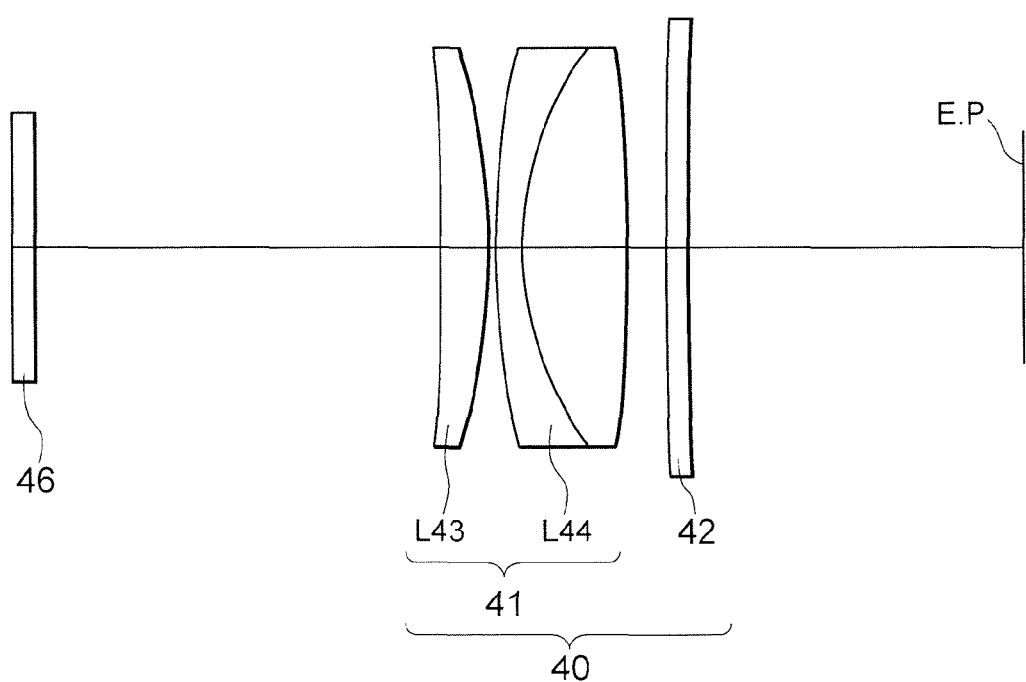
FIG. 4 is a sectional view showing a lens configuration of an eyepiece optical system according to Example 4 of the present application.

FIG. 4 is a sectional view showing a lens configuration of an eyepiece optical system according to Example 4 of the first embodiment. Example 4 has the same basic lens configuration as Example 3. However, Example 4 differs from Example 3 such that the radii of curvature of the protection window member are 90 mm on the object side surface and 95 mm on the eye side surface in Example 3, while those are 200 mm on the object side surface and 240 mm on the eye side surface in Example 4.

Various values associated with the eyepiece optical system according to Example 4 are listed below in Table 4. The focal length of the eyepiece system is fe=23.16 mm.

TABLE 4

(Surface Data)

| surface number | radius of curvature | distance | nd | vd |
|---|---|---|---|---|
| 1) | ∞ | 20.2 | 1.0 | |
| 2) | −175.00000 | 2.2 | 1.51680 | 64.14 |
| 3) | −29.50000 | 0.3 | 1.0 | |
| 4) | 38.00000 | 1.2 | 1.84666 | 23.78 |
| 5) | 14.00000 | 4.5 | 1.80400 | 46.58 |
| 6) | −78.00000 | 1.8 | 1.0 | |
| 7) | 200.00000 | 1.0 | 1.49108 | 57.57 |
| 8) | 240.00000 | 15.2 | 1.0 | |
| 9) | E.P | | | |

(Values for Conditional Expressions)

(1) |R| (object side surface)/fe = 8.62
(1) |R| (eye side surface)/fe = 10.35
(2) fe = 23.16
(3) fe/3 = 7.72

Figure 9:
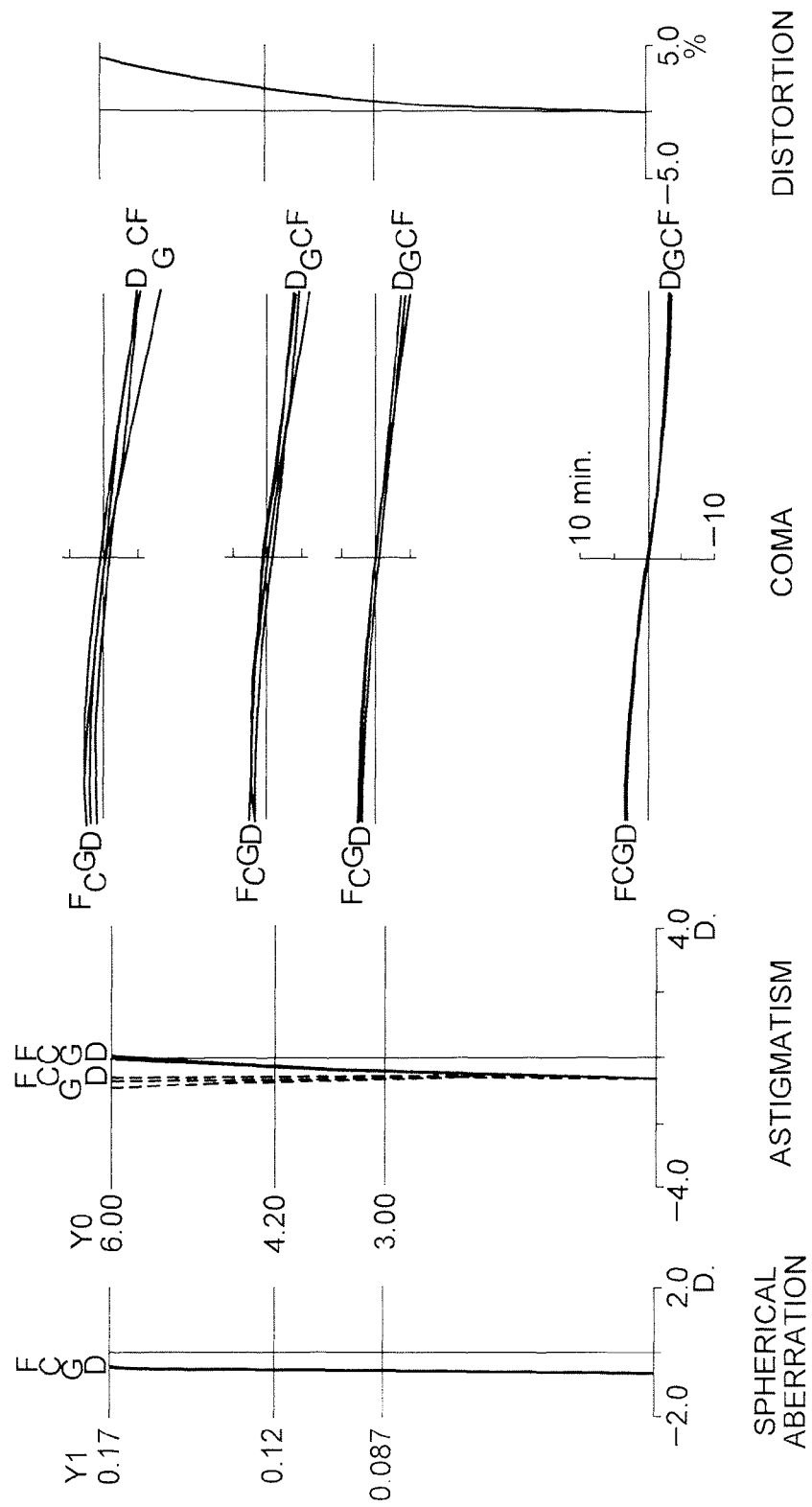
FIG. 9 displays graphs showing various aberrations of the eyepiece optical system according to Example 4 of the present application.

FIG. 9 displays graphs showing various aberrations of the eyepiece optical system 40 according to Example 4 of the first embodiment. As is apparent from the respective graphs, the eyepiece optical system 40 according to Example 4 shows superb optical performance as a result of good corrections to various aberrations. Moreover, in comparison with FIG. 8 according to Example 3, it is understood that even if difference in the radii of curvature of the object side surface and the eye side surface of the protection window member 42 is made larger within the range of conditional expression (1), deterioration in aberration performance of the eyepiece optical system 40 does not exist.

EXAMPLE 5

Figure 5:
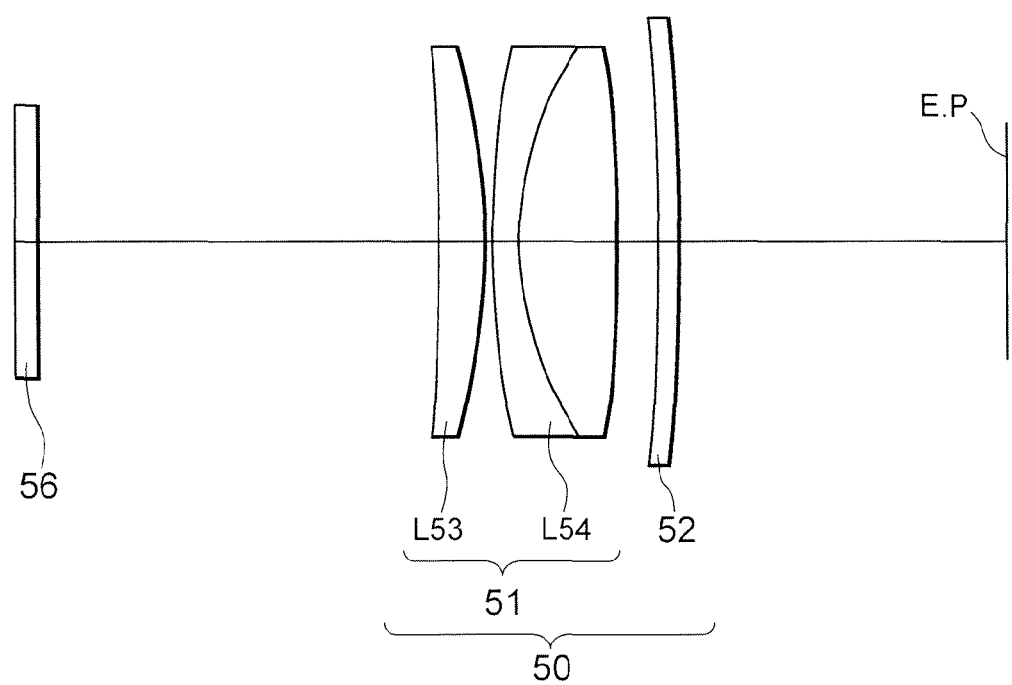
FIG. 5 is a sectional view showing a lens configuration of an eyepiece optical system according to Example 5 of the present application.

FIG. 5 is a sectional view showing a lens configuration of an eyepiece optical system according to Example 5 of the first embodiment. Although the Example 5 has the same basic lens configuration as the Examples 3 and 4, it differs such that the protection window member 52 has a concave surface facing the object side and both of the radii of curvature on the object side surface and on the eye side surface are 150 mm.

Various values associated with the eyepiece optical system according to Example 5 are listed below in Table 5. The focal length of the eyepiece system is fe=23.16 mm.

TABLE 5

(Surface Data)

| surface number | radius of curvature | distance | nd | vd |
|---|---|---|---|---|
| 1) | ∞ | 20.2 | 1.0 | |
| 2) | −175.00000 | 2.2 | 1.51680 | 64.14 |

TABLE 5-continued

| | | | | |
|---|---|---|---|---|
| 3) | −29.50000 | 0.3 | 1.0 | |
| 4) | 38.00000 | 1.2 | 1.84666 | 23.78 |
| 5) | 14.00000 | 4.5 | 1.80400 | 46.58 |
| 6) | −78.00000 | 1.8 | 1.0 | |
| 7) | −150.00000 | 1.0 | 1.49108 | 57.57 |
| 8) | −150.00000 | 15.2 | 1.0 | |
| 9) | E.P | | | |

(Values for Conditional Expressions)

(1) |R|/fe = 6.47
(2) fe = 23.16
(3) fe/3 = 7.72

Figure 10:
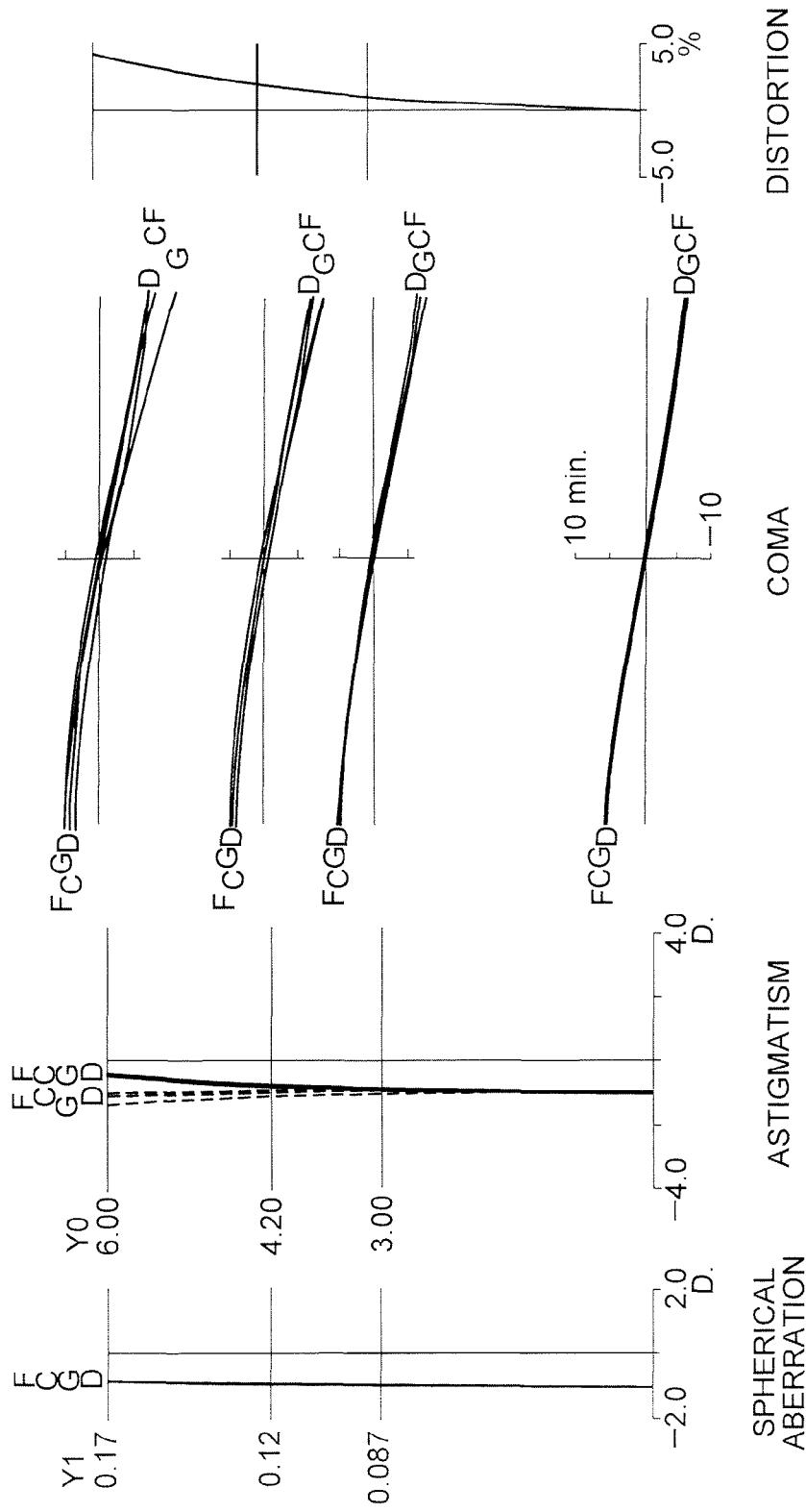
FIG. 10 displays graphs showing various aberrations of the eyepiece optical system according to Example 5 of the present application.

FIG. 10 displays graphs showing various aberrations of the eyepiece optical system 50 according to Example 5 of the present application. As is apparent from the respective graphs, the eyepiece optical system 50 according to Example 5 shows superb optical performance as a result of good corrections to various aberrations. Moreover, in comparison with FIG. 8 according to Example 3 and FIG. 9 according to Example 4, it is understood that even if the protection window member 52 has a concave surface facing the object side within the range of the above-described conditional expression, deterioration in aberration performance of the eyepiece optical system 50 does not exist.

(Second Embodiment)

Figure 12:
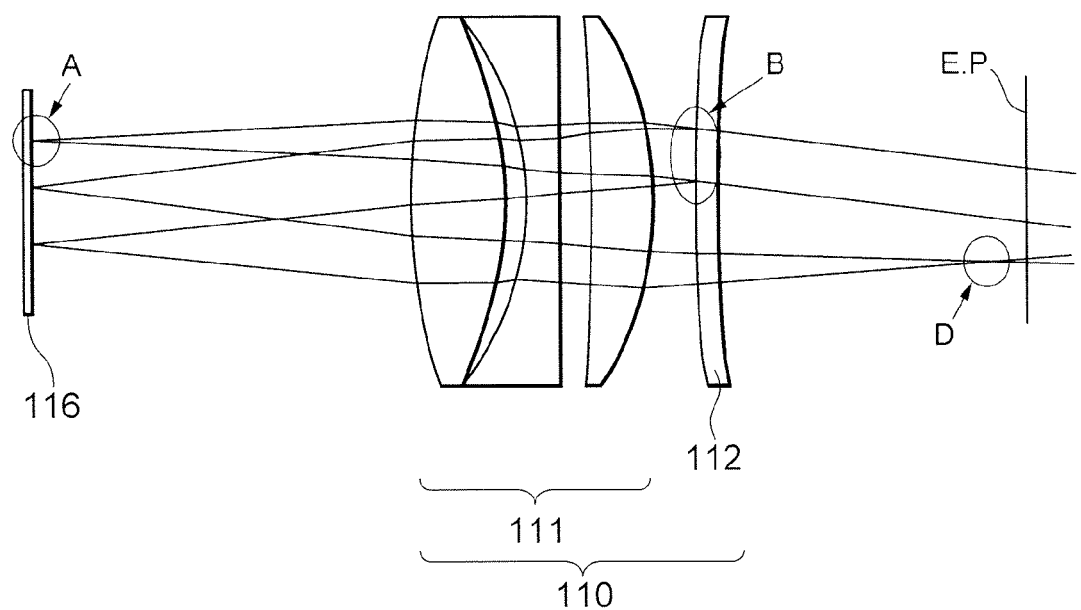
FIG. 12 is a sectional view showing a lens configuration of an eyepiece optical system according to a second embodiment of the present application.

An eyepiece optical system 110 according to a second embodiment of the present application is explained below with reference to FIG. 12. The eyepiece optical system 110 is provided for focusing an image displayed on a display member 116 such as a liquid crystal onto an eye of an observer.

The eyepiece optical system 110 according to the second embodiment of the present application includes, an eyepiece system 111, and an optical member disposed to an eye side of the eyepiece system 111 as a protection window member (hereinafter called 'a protection window member 112'), the protection window member 112 has a surface having a meniscus shape on the periphery thereof, and the following conditional expression is satisfied:

$$2.00 < |R|/fe < 22.00 \quad (1)$$

where fe denotes a focal length of the eyepiece system 111 when diopter of the eyepiece system 111 is 0 (m$^{-1}$), and R denotes a radius of curvature of the surface having the meniscus shape.

In the eyepiece optical system 110 according to the second embodiment of the present application, with providing the protection window member 112 having a meniscus shape on the periphery to the eye side of the eyepiece system 111, it becomes possible to give a divergent effect to light rays emanated from an image of a luminescent spot (an image of a display member) in the field of view, incident on the periphery of the protection window member 112 and reflected therefrom, so that a position where the luminescent spot is focused again can be separated away from the display member. As a result, the ghost image that is focused again and a regular real image are made not to be observed at the same time, so that the visibility of the ghost image is reduced.

Conditional expression (1) defines the optimum shape on the periphery of the protection window member 112. With satisfying conditional expression (1), it becomes possible to effectively avoid ghost images.

When the value of conditional expression (1) is equal to or falls below the lower limit, it becomes easy to avoid the ghost images generated in the field of view. However, refractive power on the periphery of the protection window member 112 becomes strong, so that an adverse effect is made on aberration performance of the whole of the eyepiece optical system 110. As a result, high optical performance cannot be obtained. On the other hand, when the value of conditional expression (1) is equal to or exceeds the upper limit, although the effect to aberration performance of the eyepiece optical system 110 becomes small, the position where the ghost forming light rays are focused again becomes closer to the display member 116, so that the ghost image tends to be generated. In this case, when the eyepiece optical system 110 is moved along the optical axis for adjusting diopter, there is a possibility that the ghost image becomes easy to be observed.

Although the second embodiment is different from the first embodiment on the point that the second embodiment defines the periphery of the protection window member 112, since ghost forming light rays tend to be reflected from the periphery of an optical member disposed to the eye side, with adopting such a construction, it becomes possible to effectively avoid ghost images.

In the second embodiment, the periphery means a portion where a distance from the optical axis is outside a quarter of an effective diameter of the eyepiece system 111. This is because the particular portion tends to effect generation of ghost images.

On the other hand, a central portion where a distance from the optical axis is inside a quarter of an effective diameter of the eyepiece system 111 has a plane shape perpendicular to the optical axis. Since this portion hardly tends to reflect ghost forming light rays, with adopting such a shape, it becomes possible to effectively suppress aberrations in comparison with a case where the whole surface is made to be a curved surface.

In the eyepiece optical system 110 according to the second embodiment, the protection window member 112 having a meniscus shape is preferably disposed with a concave surface facing the eye side. With disposing the concave surface facing the eye side, external light rays from the eye side become hard to be reflected from the eye side surface of the protection window member 112 and enter the pupil of the observer. In particular, the external light rays upon observation are incident with a large angle of incidence with respect to the optical axis of the eyepiece owing to a head of the observer. Accordingly, with making the eye side optical surface a concave shape, the optical surface becomes located inward in comparison with a convex shape, so that the external light rays become difficult to enter. Even upon entering, the angle of incidence becomes larger in comparison with a convex surface, so that external light rays tend to be reflected to outside of the field of view, and become difficult to enter the observer's eye.

Moreover, the eyepiece optical system 110 according to the second embodiment satisfies the following conditional expressions:

$$fe < 40.00 \quad (2)$$

$$Y < fe/3.00 \quad (3)$$

where Y denotes the maximum image height of the real image to be observed.

Conditional expression (2) defines a focal length of the eyepiece system 111. Conditional expression (3) defines the upper limit of the maximum image height of the real image.

With satisfying conditional expressions (2) and (3), it becomes possible to effectively avoid ghost images. When the value of conditional expression (3) is equal to or exceeds the upper limit, the real image plane to be observed becomes large, so that curvature of the protection window member 112 affects aberrations of the eyepiece, in particular, peripheral performance of the field of view.

In the second embodiment, the protection window member 112 is preferably made from resin. With this construction, the protection window member 112 becomes light and easy to be formed, and impact resistance can be increased. As for the resin, for example, acrylic and polycarbonate may be used.

Figure 13:
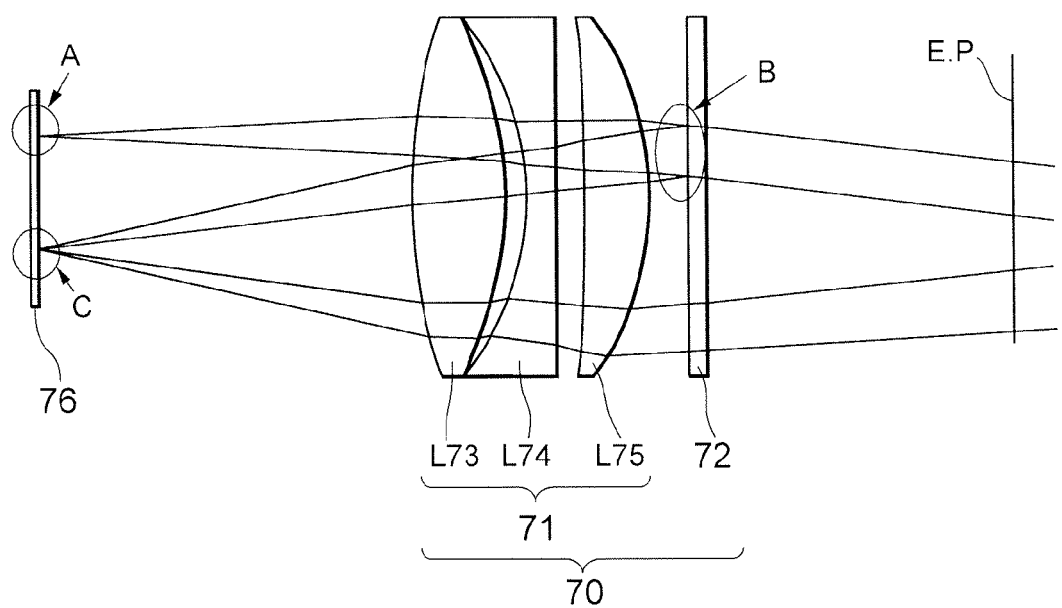
FIG. 13 is a sectional view showing a lens configuration of an eyepiece optical system according to a reference example.

FIG. 13 is a sectional view showing a lens configuration of an eyepiece optical system 70 as a reference example in comparison with the embodiments of the present application, in which a display member 76 such as an electronic view finder (EVF) is observed by an eyepiece system 71 having three elements and a protection window member 72 constructed by a plane parallel plate and disposed to the eye side thereof.

Similar to Examples 1 through 3, the eyepiece system 71 is composed of a positive lens L73 having a double convex shape, a negative lens L74 having a double concave shape, and a positive meniscus lens L75 having a concave surface facing the object side.

As shown in FIG. 13, an image of a point A on the display member 76 is led to an eyepoint (E.P) through the eyepiece and is observed. On the other hand, when luminance of the image of the point A is high, intensity of bundle of rays reflected, upon passing through the protection window member 72, from the surface (point B) of the protection window member 72 increases. The reflected rays pass through the eyepiece 71, form again an image of the point A on the surface (point C) of the display member 76. Then, the rays are reflected again on the surface of the display member 76, and led to the eyepoint (E.P). In this instance, when the brightness of the display in the vicinity of the point C is low, the displayed image of the point A formed again is observed as a ghost image.

Various values associated with the eyepiece optical system according to the reference example are listed below in Table 6. The focal length of the eyepiece system is fe=24.59 mm.

TABLE 6

| surface number | radius of curvature | distance | nd | vd |
|---|---|---|---|---|
| 1) | ∞ | 18.5 | 1.0 | |
| *2) | 18.46305 | 4.5 | 1.49108 | 57.57 |
| 3) | −14.09265 | 1.0 | 1.0 | |
| *4) | −10.86467 | 1.5 | 1.58518 | 30.24 |
| 5) | 203.88888 | 1.5 | 1.0 | |
| 6) | −95.39091 | 3.0 | 1.49108 | 57.57 |
| *7) | −11.57101 | 1.5 | 1.0 | |
| 8) | ∞ | 1.0 | 1.49108 | 57.57 |
| 9) | ∞ | 15.0 | | |
| 10) | E.P | | | |

(Aspherical Surface Data)

Surface Number: 2

$\kappa = -1.7818$
$C6 = 0.0$

Surface Number: 4

$\kappa = 1.0000$
$C6 = 0.65762E-06$

TABLE 6-continued

Surface Number: 7

$\kappa = 0.5034$
$C6 = 0.0$

Figure 14:
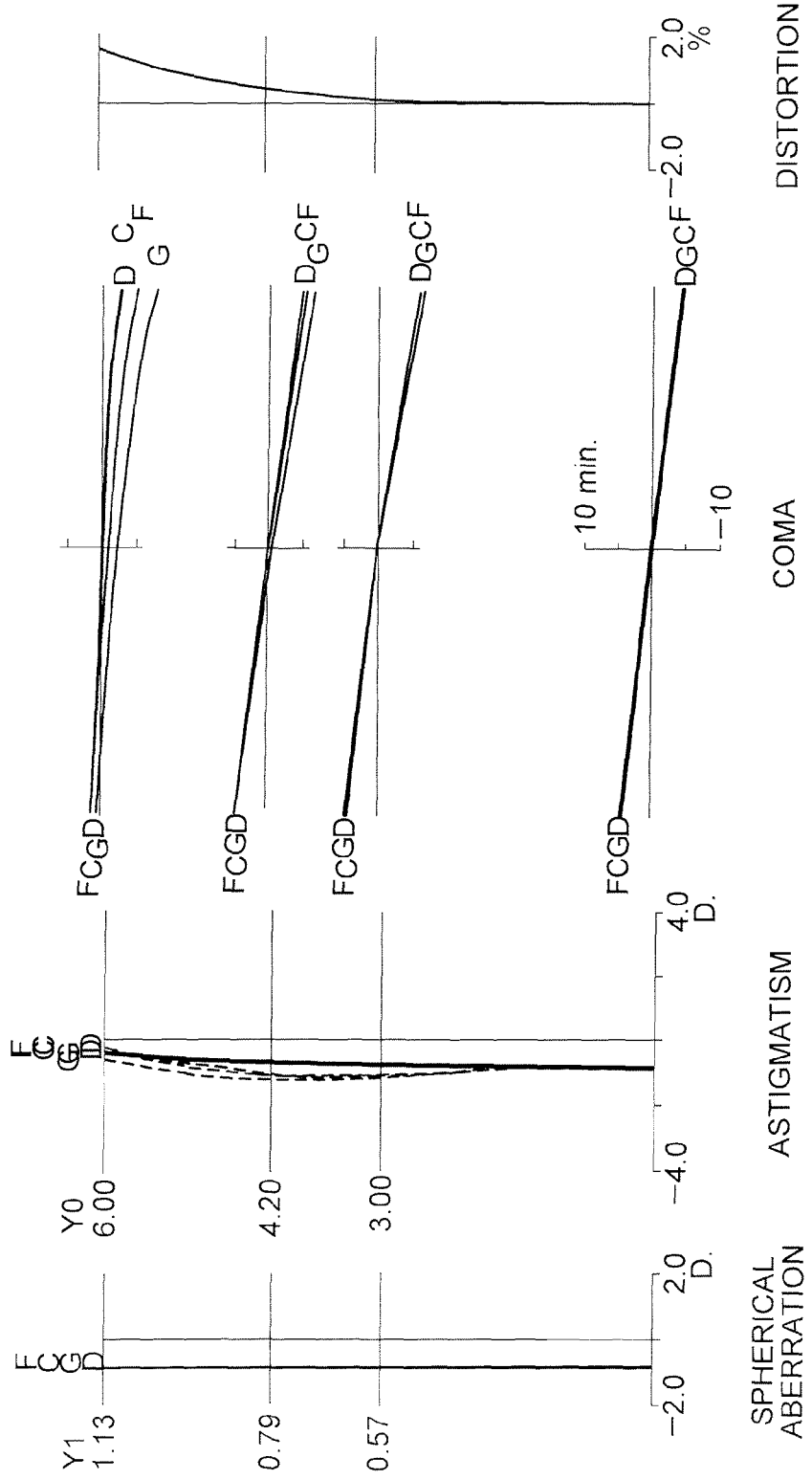
FIG. 14 displays graphs showing various aberrations of the eyepiece optical system according to the reference example.

FIG. 14 displays graphs showing various aberrations of the eyepiece optical system 70 according to the reference example. As is apparent from the respective graphs, the eyepiece optical system 70 according to the reference example shows excellent optical performance as a result of good corrections to various aberrations.

Then, a camera equipped with an eyepiece optical system according to the embodiment of the present application is explained with reference to FIG. 15.

Figure 15:
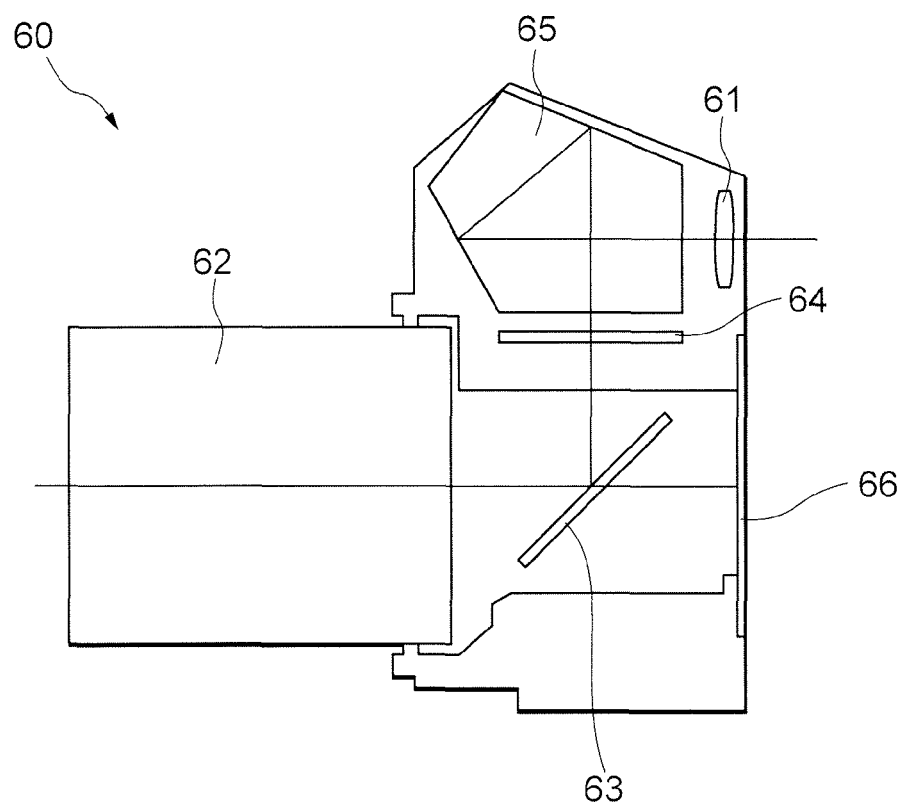
FIG. 15 is a view showing a construction of a camera equipped with an eyepiece optical system according to the present application.

FIG. 15 is a view showing a camera equipped with the eyepiece optical system according to the present application. The camera 60 is a single-lens reflex digital camera equipped with the eyepiece optical system according to the above-described Example 1 as an eyepiece optical system 61.

In the camera 60, light rays coming out from an unillustrated object (the subject to be photographed) are converged by an imaging lens 62, and focused on a focusing screen 64 through a quick return mirror 63. The light rays focused on the focusing screen 64 are reflected a plurality of times in a pentagonal roof prism 65, and led to the eyepiece optical system 61. Accordingly, a photographer can observe the subject image as an erected image through the eyepiece optical system 61.

When the photographer presses an unillustrated release button, the quick return mirror 63 is retracted from an optical path, the light rays from the unillustrated subject reach an imaging device 66. Accordingly, the light rays from the subject are captured by the imaging device 66, and the photographed image is stored in an unillustrated memory as a subject image. In this manner, the photographer can take a picture of the subject by the camera 60.

Here, as described above, the eyepiece optical system according to Example 1 installed in the camera 60 as the eyepiece optical system 61 makes it possible to avoid generation of ghost images without affecting aberration performance of the eyepiece. Accordingly, the camera 60 makes it possible to realize excellent optical performance. The same effect as the above-described camera 60 can be obtained upon constructing a camera equipped with any one of eyepiece optical systems according to Examples 2 through 5 as an eyepiece optical system 61. Moreover, the same effect as the camera 60 can be obtained upon installing any one of eyepiece optical systems according to the above-described each Example into a camera having no quick-return mirror 63.

As described above, the present invention makes it possible to provide an eyepiece optical system capable of effectively reducing ghost images generated such that light rays emanated from a luminous spot and the like in the field of view are reflected from an optical surface disposed to a more eye side than the eyepiece system, and an optical apparatus equipped with the eyepiece optical system.

What is claimed is:
1. An eyepiece optical system comprising:
an eyepiece system; and
an optical member disposed to an eye side of the eyepiece system, the optical member having a meniscus shape at least on a periphery thereof and the following conditional expression being satisfied:

$$4.85 < |R|/fe < 22.00$$

where fe denotes a focal length of the eyepiece system when diopter of the eyepiece system is $0(m^{-1})$, and R denotes a radius of curvature of at least one surface of the meniscus shaped portion of the optical member.

2. The eyepiece optical system according to claim 1, wherein the optical member is meniscus-shaped within an effective diameter.

3. The eyepiece optical system according to claim 1, wherein the optical member having the meniscus shape has a concave surface facing the eye side.

4. The eyepiece optical system according to claim 1, wherein the following conditional expressions are satisfied:

$$fe < 40.00$$

$$Y < fe/3.00$$

where Y denotes the maximum image height of a real image to be observed.

5. The eyepiece optical system according to claim 1, wherein the optical member is made from resin.

6. The eyepiece optical system according to claim 1, wherein the optical member has the meniscus shape only on the periphery thereof.

7. The eyepiece optical system according to claim 6, wherein the periphery of the optical member is a portion where a distance from an optical axis is outside a quarter of an effective diameter of the eyepiece system.

8. The eyepiece optical system according to claim 6, wherein a central portion of the optical member has a plane shape perpendicular to the optical axis.

9. The eyepiece optical system according to claim 8, wherein the central portion of the optical member is a portion where a distance from the optical axis is inside a quarter of an effective diameter of the eyepiece system.

10. The eyepiece optical system according to claim 6, wherein the optical member is disposed with a concave surface facing the eye side.

11. The eyepiece optical system according to claim 6, wherein the following conditional expressions are satisfied:

$$fe < 40.00$$

$$Y < fe/3.00$$

where Y denotes the maximum image height of a real image to be observed.

12. The eyepiece optical system according to claim 6, wherein the optical member is made from resin.

13. An optical apparatus equipped with the eyepiece optical system according claim 1.

14. A method for manufacturing an eyepiece optical system having an eyepiece system and an optical member, comprising;
a step of forming the optical member into a meniscus shape at least on a periphery thereof so as to satisfy following conditional expression:

$$4.85 < |R| < /fe22.00,$$

a step of disposing the eyepiece system into a lens barrel, and
a step of disposing the optical member on an eye side of the eyepiece system in the lens barrel,
where fe denotes a focal length of the eyepiece system when diopter of the eyepiece system is $0(m^{-1})$, and R denotes a radius of curvature of at least one surface of the meniscus shaped portion of the optical member.

15. The method for manufacturing an eyepiece optical system according to claim 14,
wherein the optical member is formed into the meniscus shape in an effective diameter thereof.

16. The method for manufacturing an eyepiece optical system according to claim 14,
wherein the following conditional expressions are satisfied:

$$fe < 40.00$$

$$Y < fe/3.00$$

where Y denotes the maximum image height of a real image to be observed.

17. The method for manufacturing an eyepiece optical system according to claim 14, wherein the optical member is made from resin.

18. An eyepiece optical system comprising:
an eyepiece system; and
an optical member disposed to an eye side of the eyepiece system,
the optical member having a meniscus shape at least on a periphery thereof and the following conditional expression being satisfied:

$$2.00 < |R| < /fe22.00$$

$$fe < 40.00$$

$$Y < fe/3.00$$

where fe denotes a focal length of the eyepiece system when diopter of the eyepiece system is $0(m^{-1})$, R denotes a radius of curvature of at least one surface of the meniscus shaped portion of the optical member, and Y denotes the maximum image height of a real image to be observed.

19. A method for manufacturing an eyepiece optical system having an eyepiece system and an optical member, comprising:
a step of forming the optical member into a meniscus shape at least on a periphery thereof and so as to satisfy following conditional expressions:

$$2.00 < |R| < /fe22.00$$

$$fe < 40.00$$

$$Y < fe/3.00,$$

a step of disposing the eyepiece system into a lens barrel, and
a step of disposing the optical member on an eye side of the eyepiece system in the lens barrel,
where fe denotes a focal length of the eyepiece system when diopter of the eyepiece system is $0(m^{-1})$, R denotes a radius of curvature of at least one surface of the meniscus shaped portion of the optical member, and Y denotes the maximum image height of a real image to be observed.

* * * * *